United States Patent
Chu et al.

(10) Patent No.: US 7,411,965 B2
(45) Date of Patent: *Aug. 12, 2008

(54) METHOD AND APPARATUS FOR DETERMINING A MULTILAYER SWITCHING PATH

(75) Inventors: Clare Chu, Fremont, CA (US); Mehryar Garakani, Los Angeles, CA (US); Kenneth E. Mueller, II, Santa Barbara, CA (US)

(73) Assignee: Cisco Technology, Inc., San Jose, CA (US)

(*) Notice: Subject to any disclaimer, the term of this patent is extended or adjusted under 35 U.S.C. 154(b) by 597 days.

This patent is subject to a terminal disclaimer.

(21) Appl. No.: 11/064,746

(22) Filed: Feb. 23, 2005

(65) Prior Publication Data

US 2005/0152399 A1    Jul. 14, 2005

Related U.S. Application Data

(63) Continuation of application No. 09/629,044, filed on Jul. 31, 2000, now Pat. No. 6,954,462.

(51) Int. Cl.
*H04L 12/28* (2006.01)
*H04L 12/56* (2006.01)

(52) U.S. Cl. .................................. 370/400; 370/401
(58) Field of Classification Search ......... 370/351–356, 370/392, 400, 389, 469, 401; 709/226
See application file for complete search history.

(56) References Cited

U.S. PATENT DOCUMENTS

| | | | |
|---|---|---|---|
| 6,081,522 A | 6/2000 | Hendel et al. | |
| 6,088,356 A | 7/2000 | Hendel et al. | |
| 6,094,435 A | 7/2000 | Hoffman et al. | |
| 6,256,314 B1 | 7/2001 | Rodrig et al. | |
| 6,424,659 B2 | 7/2002 | Viswanadham et al. | |
| 6,625,650 B2 | 9/2003 | Stelliga | |
| 6,874,016 B1 * | 3/2005 | Gai et al. | 709/215 |
| 7,012,919 B1 * | 3/2006 | So et al. | 370/392 |
| 2004/0076160 A1 * | 4/2004 | Phaltankar | 370/395.1 |

* cited by examiner

*Primary Examiner*—Ajit G Patel
(74) *Attorney, Agent, or Firm*—Hickman Palermo Truong & Becker LLP

(57) ABSTRACT

A method and apparatus that provide for determining a multilayer switching path are disclosed. In one embodiment of the invention, a Layer 3 path and a Layer 2 path between a source device and destination device are first determined in order to identify the relevant switch engines that perform the multilayer switching. Determining whether the switch engines satisfy a set of criteria identifies the relevant switch engines.

28 Claims, 12 Drawing Sheets

METHOD AND APPARATUS FOR DETERMINING A MULTILAYER SWITCHING PATH

PRIORITY CLAIM

This application claims domestic priority under 35 U.S.C. §120 as a continuation of U.S. non-provisional application Ser. No. 09/629,044, filed Jul. 31, 2000 now U.S. Pat. No. 6,954,462, entitled "Method and Apparatus for Determining a Multilayer Switching Path," naming Clare Chu, Mehryar Garakani, and Kenneth E. Mueller, II as inventors, the entire disclosure of which is hereby incorporated by reference for all purposes as if fully set forth herein.

FIELD OF INVENTION

The present invention generally relates to management of computer networks, and relates more specifically to determining a multilayer switching path between two or more devices in a switched network.

BACKGROUND

A computer network generally includes a number of devices, including switches, routers and hubs, connected so as to allow communication among the devices. The devices within a network are often categorized into two classes: end stations such as workstations, desktop PCs, printers, servers, hosts, fax machines, and devices that primarily supply or consume information; and network devices such as gateways, switches and routers that primarily forward information between the other devices.

Network devices ordinarily operate on a continuous basis. Each device has one or more circuit boards, a microprocessor and a memory, and runs a control program. In general, networks often include several different types of data switching and routing devices. These network devices may have different physical characteristics. New devices, with characteristics that are presently unknown, are constantly being developed. In addition, the characteristics of many network devices may change over time. For example, characteristics of the network devices change when subsystems like boards, network interface modules, and other parts are added or removed from a device.

Many networks are managed, supervised and maintained by a network administrator. Typically, the network administrator employs a variety of software and hardware tools to monitor and maintain a network. The Open Systems Interconnection ("OSI") reference model is useful in classifying communications between network devices. The OSI reference model divides the tasks of moving information between the network devices into groups of manageable tasks. Each group of tasks is assigned to one of seven layers of the OSI reference model. The upper layers of the OSI reference model relate more to the end user. For example, the highest layer (Layer 7), also referred to as the OSI Application Layer, is the closest to the end-user in that both the OSI Application Layer and the end-user interact directly with software applications that implement a communication component. The lower layers of the OSI reference model relate to data transport. For example, the OSI Physical Layer, also referred to as Layer 1, defines the electrical, mechanical, procedural, and functional specifications for the physical link between communicating network systems.

The OSI Data Link Layer, also referred to as Layer 2, defines network and protocol characteristics, including physical addressing, network topology, sequencing of frames, and flow control. Layer 2 further comprises a Logical Link Control ("LLC") sublayer and a Media Access Control ("MAC") sublayer. The LLC sublayer manages communications between devices over a single link of a network. The MAC sublayer manages protocol access to the physical network medium. Data communications devices that operate principally at the Layer 2 level are referred to as data link layer devices. Bridges and switches are examples of data link layer devices. Bridges connect and enable packet forwarding between networks. Today, switches and switching technology dominate in applications in which bridging technologies were implemented in prior network designs. Switches have superior throughput performance, higher port density, lower per-port cost and greater flexibility. Thus, switches have emerged as the replacement technology for bridges. Also, switches, because of their superiority, are viewed as complements to routing technology as further explained herein.

The OSI Network Layer, also referred to as a Layer 3, provides routing and related functions that enable data to move across an internetwork from a source device to a destination device. For example, Layer 3 may manage the routing of a packet of data from one Virtual Local Area Network (VLAN) to another. Routing involves two basic activities: 1) determining optimal routing paths, 2) transporting packets through an internetwork, hereinafter referred to as "switching." To determine optimal routing paths, routing algorithms are used to initialize and maintain routing tables, which contain route information. Examples of route information include destination and "next hop" information that tell a route processor that a particular destination can be reached optimally by sending a packet to a particular router representing the "next hop" on the way to the final destination. When a route processor receives an incoming packet, the router checks the destination address and attempts to associate the destination address with a next hop. The path traversed by a packet at Layer 3 is referred to herein as "Layer 3 path." The path determination at Layer 3 is referred to herein as "Layer 3 path tracing."

Although path determination at Layer 3 identifies a path from route processor to route processor, it does not identify the actual network devices, such as LAN switches and bridges, which a packet may traverse to go from a source device to a destination device. The path between any two Layer 3 devices may traverse entire networks of devices that operate at Layer 2. The path traversed by a packet at Layer 2 is referred to herein as "Layer 2 path." The path determination at Layer 2 is referred to herein as "Layer 2 path tracing."

Thus, an effective network management system would include both Layer 3 path tracing and Layer 2 path tracing. However, knowledge of the Layer 3 and Layer 2 paths may not provide certain path information, such as shortcuts in the Layer 3 and Layer 2 paths, whereby a packet may bypass certain devices at Layer 3 and Layer 2 as the packet moves to the destination device. For example, in the interest of efficiency, switches may be configured to perform some of the functions that a route processor would have performed, and therefore the router is bypassed.

The process of transporting packets by bypassing certain Layer 3 and Layer 2 devices through which the packets would have otherwise traversed is referred to herein as "multilayer switching." Multilayer switching may be desirable to reduce the work to be performed by route processors and to reduce latency. Switches are significantly faster because they switch in hardware, while route processors route in software, and therefore use of switches may result in reduced packet latency. Details of multilayer switching are further explained herein. A path tracing that takes into account multilayer switching is herein referred to as "multilayer switching path tracing."

In addition, when switches and associated route processors are configured to perform multilayer switching, a mechanism is needed to determine whether particular switches and route processors have been configured correctly. Multilayer switching path tracing would provide a means of investigating network switch and route processor configurations for use in improved network management. It would also provide a more reliable way to create, manipulate and display a multi-layer topology of network devices.

Based on the foregoing, there is a clear need for a mechanism that can identify the path from a source device to a destination device in a switched network at multiple network layers.

There is a specific need for a way to carry out path tracing for multilayer switching paths, for use in network management.

SUMMARY

The foregoing needs, and other needs and objects that will become apparent for the following description, are achieved in the present invention, which comprises, in one aspect, a method of determining a multilayer switching path for a flow between a source device and a destination device in a switched network. According to an embodiment, a Layer 3 path and a Layer 2 path through the network from the source device to the destination device is determined. Each route processor of the network that is in the Layer 3 path and that appears on a Layer 2 path that is associated with the source device and the destination device and that leads to and emanates from the route processor is selected. For each selected route processor, a switch in the network that satisfies a pre-determined set of criteria as a relevant switch engine that multilayer switches the selected route processor is selected. Information that defines a multilayer switching path and that includes information identifying the source device, destination device, and each selected switch, is created and stored.

According to one feature of this aspect, selection of the switch that satisfies the pre-determined set of criteria comprises identifying one or more switches in the network that are configured as switch engines, associated with the selected route processor, and included in Layer 2 paths leading to and emanating from the selected route processor.

According to another feature, selection of the switch that satisfies the pre-determined set of criteria as the relevant switch engine further comprises selecting from the set of switches as the relevant switch engine the switch that contains an MLS-entry that matches the flow between the source device and the destination device when there is only one switch that contains the MLS-entry that matches the flow.

In another feature, selection of the switch that satisfies the pre-determined set of criteria as the relevant switch engine further comprises selecting from the set of switches as the relevant switch engine the switch that contains an MLS-entry that matches the flow between the source device and the destination device and that is the farthest away on the Layer 2 path from the selected route processor when there is more than one switch that contains the MLS-entry that matches the flow.

According to yet another feature, a flow is established between the source device and the destination device when no flow exists between the source device and destination device during determination of the multilayer switching path.

In another feature, the establishment of the flow between the source device and the destination device further comprises sending packets from the source device to the destination device when the source device is not remote. However, when the source device is remote, and when packets that are sent from the network management station traverse the relevant switch engine for the selected route processor, packets are sent from a network management station.

According to another feature, the establishment of the flow between the source device and the destination device further comprises sending packets from any route processor that is upstream from the selected route processor to the destination device when the source device is remote. This feature is useful when the packets that are sent from a network management station do not traverse the relevant switch engine for the selected route processor.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for determining a multilayer switching path is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

For purposes of illustrating an example, an embodiment is described in the context of Internet Protocol ("IP") network addressing. In the IP standard, each host in a network is assigned a unique 32-bit number ("host IP address"), which is used for all communications with the host. Each packet sent across an IP network contains the 32-bit IP addresses of the sender (source) as well as the intended recipient (destination).

Multilayer switching, which has been defined as the process of transporting packets between a source and destination device while bypassing certain Layer 3 and Layer 2 devices, is possible in the context of flows. Based on certain configurable parameters of packets, the packets in a sequence emanating from a source device may traverse different sets of devices en route to the destination device. However, each different set of devices is a subset of the set of devices comprising the Layer 3 and Layer 2 paths that are prescribed for the given source-destination device pair at the time of packet traversal.

For purposes of explanation, a set of one or more packets that are traversing through any given set of devices is referred herein referred to as a "flow". For example, one flow may be the flow whereby a packet is routed through every route processor in the prescribed Layer 3 path for the given source-destination pair. Such a flow is herein referred to as a "single-packet path." Another flow may be the flow whereby a packet that satisfies certain flow criteria bypasses one or more route processors in the prescribed Layer 3 path. Such a flow is herein referred to as a "multilayer switching path."

Thus, a sequence of packets between a source-destination device pair may have a prescribed Layer 3 path and a prescribed Layer 2 path and yet may have more than one flow within the prescribed Layer 3 and Layer 2 paths. The details of the process of multilayer switching and flow criteria are further described herein. However, a simplified illustration of multilayer switching is presented in FIG. 1.

Figure 1:
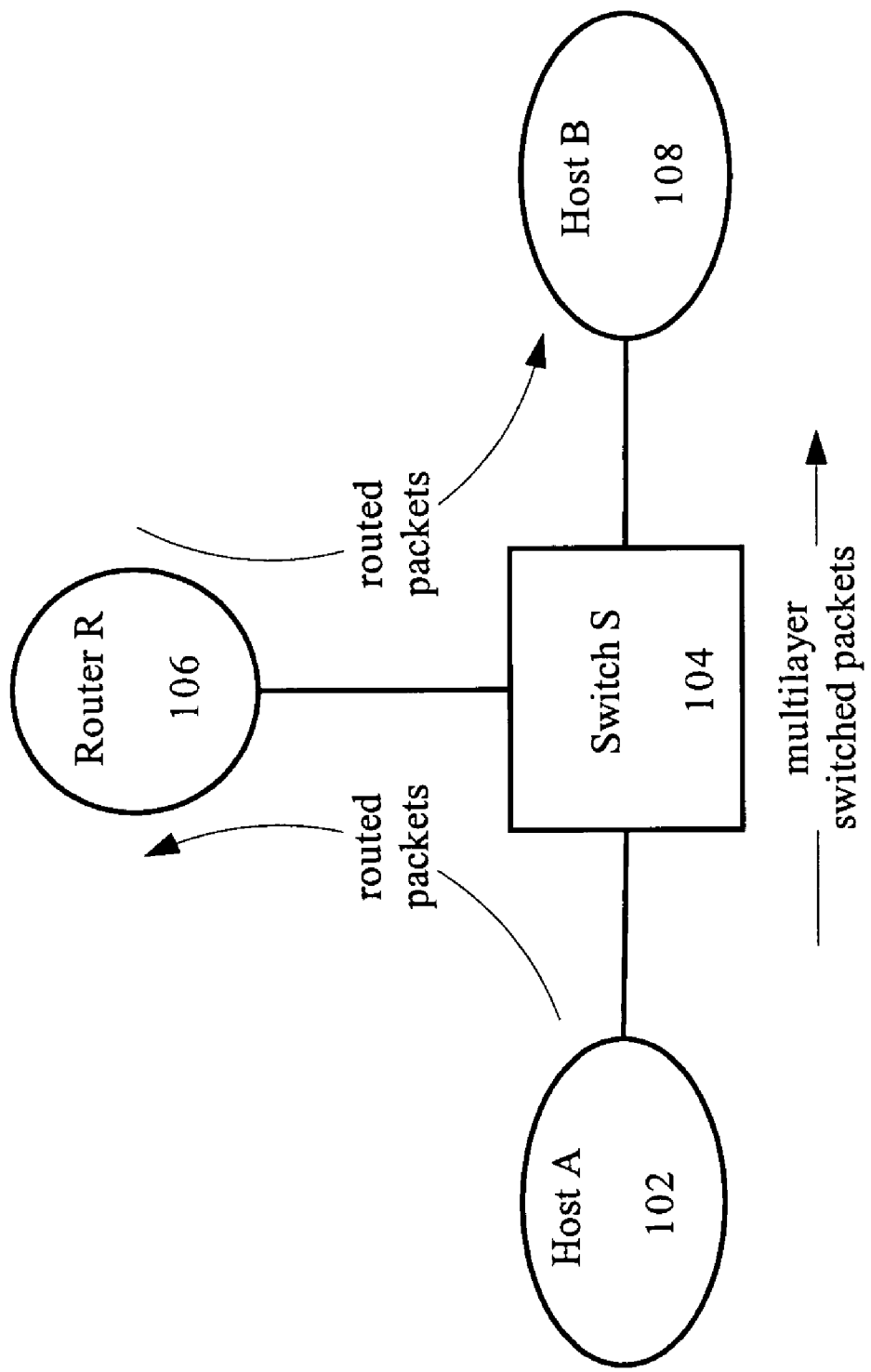
FIG. 1 is a simplified block diagram that illustrates multilayer switching.

In FIG. 1, Host A 102 is a source device. Host A 102 is connected to Switch S 104, which is connected to both a route processor Router R 106 and destination device Host B 108. Assume that Host A 102 and Host B 108 are located on different VLANs and that the Layer 3 path between Host A 102 and Host B 108 is:

Host A->Router R->Host B

Similarly, assume that the Layer 2 path between Host A 102 and Host B 108 is:

Host A->Switch S->Router R->Switch S->Host B

Assume further that Router R 106 and Switch S 104 are configured to implement multilayer switching. A router processor that is configured to implement multilayer switching is herein referred to as a "route engine." A switch that is configured to implement multilayer switching is herein referred to as a "switch engine." The multilayer switching path between Host A 102 and Host B 108 is:

Host A->Switch S->Host B

Packets that would have been routed through route processor Router R 106 bypass Router R 106 by cutting through Switch S 104 to reach Host B 108. The efficacy of switch engines is underscored when a large amount of data is transferred between a source device and a destination device. For example, when a large file is transferred between Host A 102 and Host B 108, only the first packet of data from the file needs to pass through route processor Router R 106. Router R 106 makes the appropriate routing decision, which includes the determination of the next hop and the re-writing of the packet header for the first packet. The re-writing of the packet header is further described herein in the subsection entitled "RELATIONSHIP BETWEEN ROUTE ENGINE AND SWITCH ENGINE." Thus, the first packet of the file follows the single-packet path. Ordinarily, subsequent packets from the file do not need a routing decision once the routing decision has been made for the first packet and may thus bypass Router R 106 by being multilayer switched by Switch S 104 to traverse directly to Host B 108. Thus, the subsequent packets of the file follow the multilayer switching path. However, as is further explained herein, certain criteria must be met before the packets are multilayer switched. FIG. 1 illustrates a simple case where there is only one route processor and one switch engine associated with the route processor. As a practical matter, there may be a large number of route processors and switch engines in the Layer 3 and Layer 2 paths of a given source and destination.

Figure 2A:
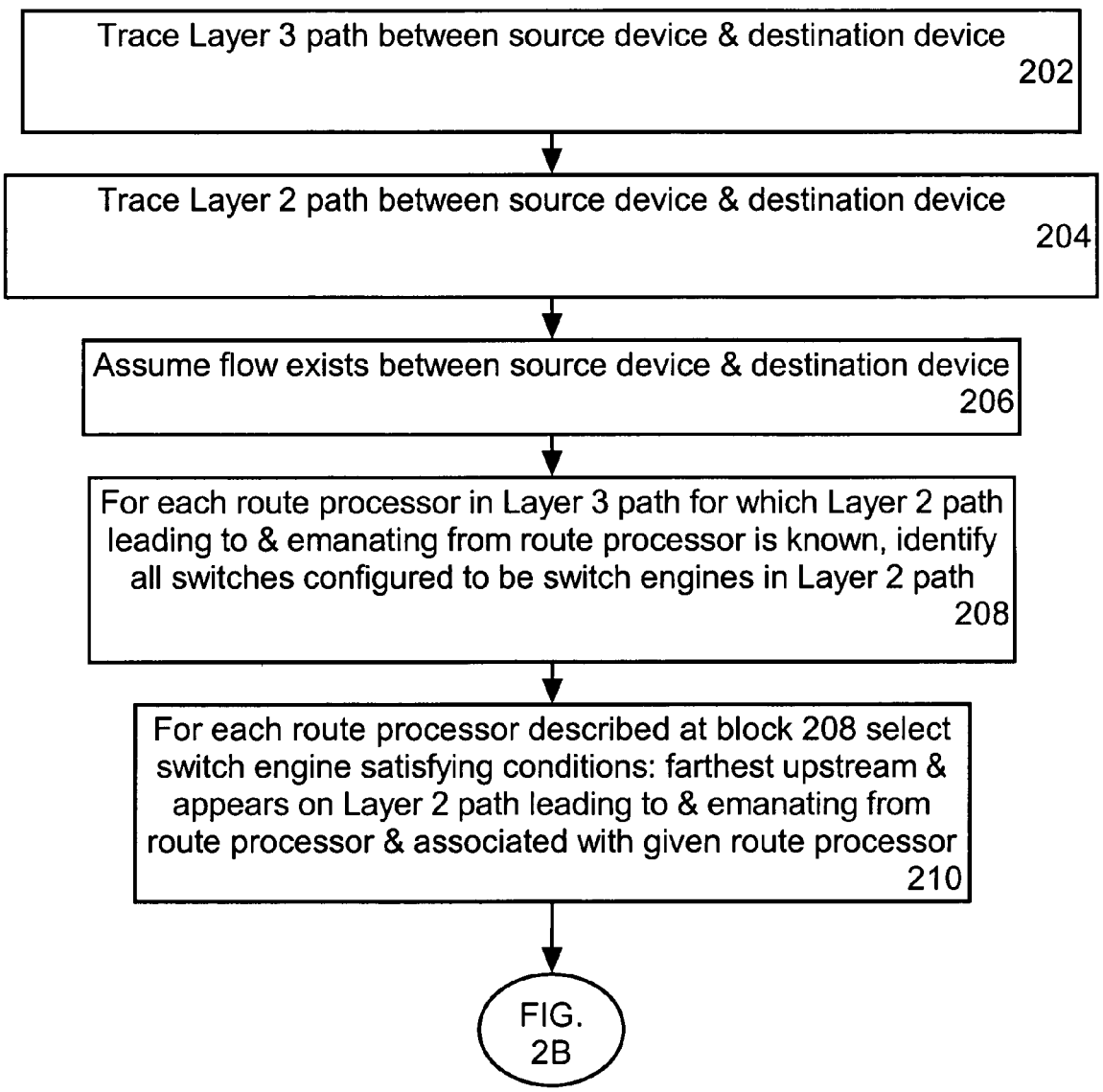
FIG. 2A, FIG. 2B, FIG. 2C are a suite of flowcharts providing an overview of a process of determining a multilayer switching path between a source device and destination device pair.
Figure 2B:
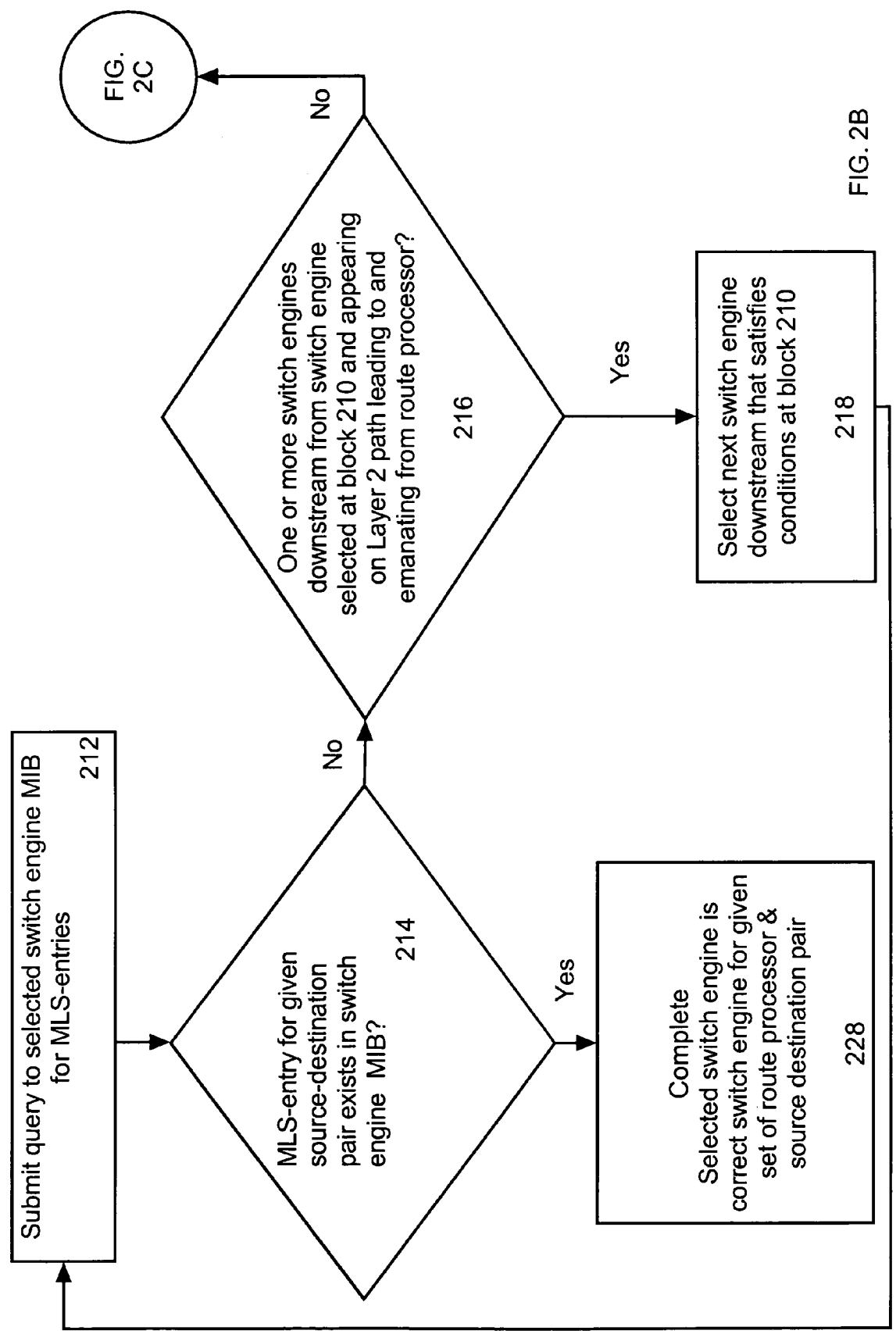
Figure 2C:
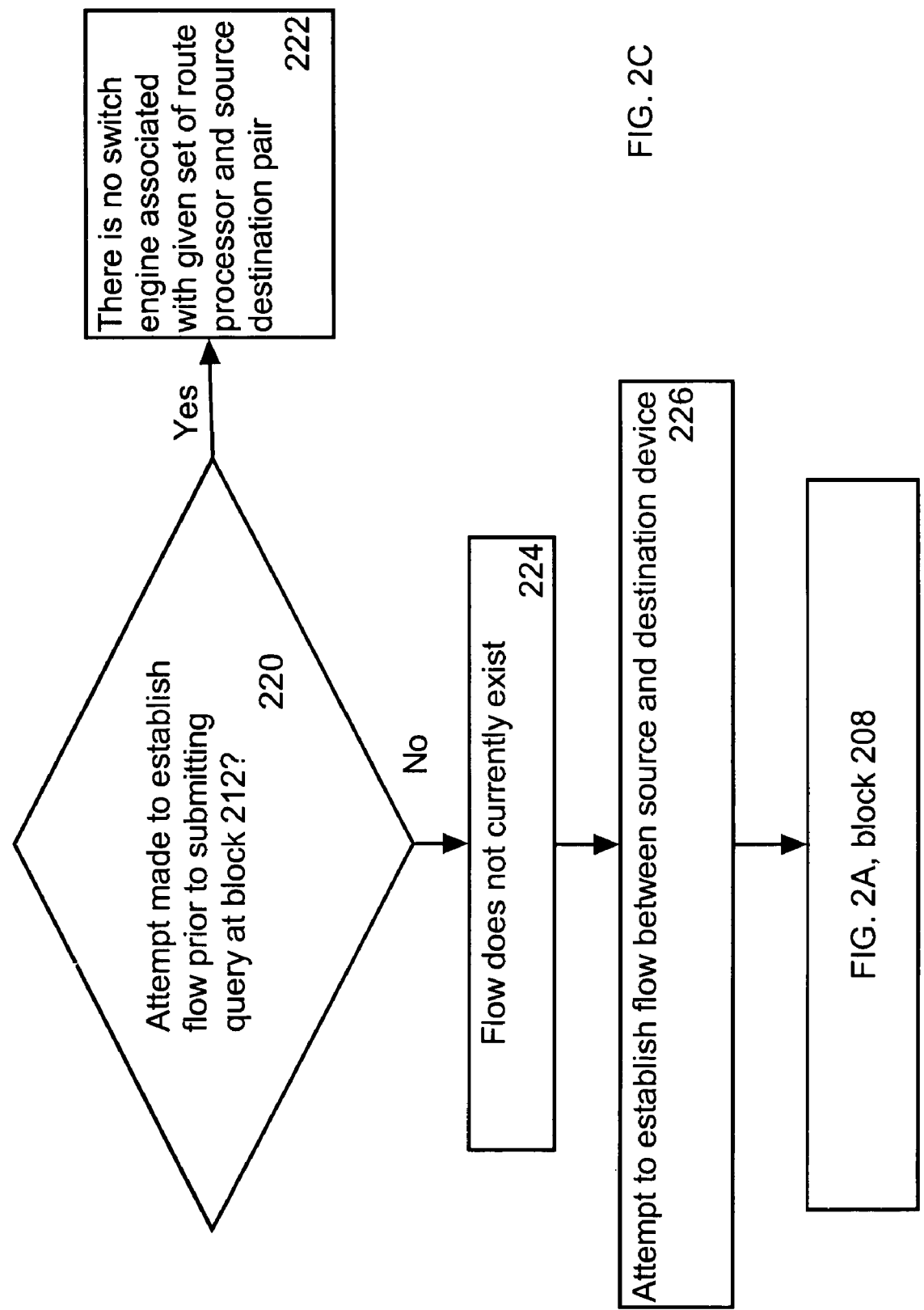

FIG. 2A, FIG. 2B, FIG. 2C are a suite of flowcharts that provide an overview of the process of determining a multilayer-switching path between a source device and destination device pair in one embodiment. Details of the process are further explained with reference to FIG. 3 et seq.

At block 202 of FIG. 2A, the process traces the Layer 3 path between a source device and a destination device. As a result, in block 202, Layer 3 path information is created and stored. The Layer 3 path between the source device and the destination device can be traced using the "traceroute" computer program or any other mechanism that is capable of accomplishing the same task. The "traceroute" software program is supported by UNIX-based network computers. Windows-based network computers support a similar software program called "tracert". Both traceroute and tracert create and store information defining the path or route comprising specific gateway computers or routers at each hop through the computer network between a source device and the destination device. In a packet-switching network, a hop is the next intermediate gateway that a packet visits on its way to its destination.

The traceroute program works by sending a packet of data, e.g., using Internet Control Message Protocol (ICMP) to the destination end-station. The packet includes a time limit value ("time to live") that is selected so as to be exceeded by the first gateway that receives the packet. In turn, the gateway returns a Time Exceeded message. The traceroute program increases the time limit value and resends the packet so that it will reach the next gateway in the path to the packet's destination.

One method of Layer 3 path tracing is disclosed in U.S. Pat. No. 6,578,087, entitled "Determining A Path Through A Managed Network", issued Jun. 10, 2003, and naming as inventors Mehryar Garakani, and Kenneth Mueller II, the entire disclosure of which is hereby incorporated by reference as if fully set forth herein.

At block 204, the process traces the Layer 2 path between the source device and destination device. As a result, in block 204, Layer 2 path information is created and stored. A method of Layer 2 path tracing is disclosed in co-pending application Ser. No. 09/524,725, entitled "A Method of Determining A data Link Path In A Managed Network", filed Mar. 14, 2000, and naming as inventor Mehryar Garakani, the entire disclosure of which is hereby incorporated by reference as if fully set forth herein. Another method of Layer 2 path determination is disclosed in co-pending application Ser. No. 09/585, 709, filed May 31, 2000, entitled "A Method And Apparatus For Determining A Layer 2 Path In A Switched Network", and naming as inventors Clare Chu, and Stephen Schleimer, the entire disclosure of which is hereby incorporated by reference as if fully set forth herein.

In subsequent steps of FIG. 2A, the process assumes that a flow exists between the source and destination devices, as indicated by block 206. At block 208, for each route processor that is in the Layer 3 path and for which the Layer 2 path leading to and emanating from the route processor is known, the process identifies all the switches that have been configured as switch engines in the Layer 2 path. Such an identification is possible when the network discovery (network management) has identified all the switches in the Layer 2 path to support a management information base ("MIB") or an equivalent of the MIB. MIBs are further described herein.

At block 210, for each route processor that has been selected at block 208, the process selects the switch engine that satisfies the following conditions: 1) the switch engine is farthest upstream from the route processor; 2) the switch engine appears on the Layer 2 path leading to a selected route processor as well as on the Layer 2 path emanating from the route processor, and 3) the switch engine is associated with specific route processor. A switch engine is said to be associated with a route processor if the switch engine is configured to bypass that particular route processor when certain flow criteria are met. Information on the above conditions may be retrieved by querying the switch engine cache in the MIB. MIBs are further described herein.

In FIG. 2B, at block 212, the process submits to the selected switch engine a query for multilayer switching entries ("MLS-entries") that may be stored in the switch engine cache. The query may take the form of a query in Simple Network Management Protocol (SNMP).

At block 214, the process determines whether any of the MLS-entries in the switch engine cache is associated with the given source and destination devices. If the process determines there is an MLS-entry in the switch engine cache that is associated with the given source-destination pair of devices, then processing is complete, as indicated by block 228, and the selected switch engine has been determined to be the correct switch engine for the given route processor, source and destination devices.

Otherwise, at block 216, the process determines whether there are one or more switch engines that match the conditions described at block 210 of FIG. 2A, and that are downstream from the switch engine that was selected at block 210. If the process determines that there are one or more switch engines that match the conditions described at block 210, and that are downstream from the switch engine that was selected at block 210, then at block 218, the process selects the next switch engine downstream that satisfies the condition described at block 210.

Otherwise, control passes to FIG. 2C. At block 220 of FIG. 2C, the process determines whether an attempt was made to establish a flow just prior to submitting the query for MLS-entries at block 212. If the process determines that an attempt was made to establish a flow just prior to submitting the query for MLS-entries, then at block 222, the process determines that there is no switch engine associated with the given set of route processor and source-destination pair of devices. However, if the process determines that no attempt was made to establish a flow just prior to submitting the query for MLS-entries, then at block 224, the process determines that no flow currently exists between the source device and the destination device. At block 226, the process attempts to establish a flow between the source device and destination device. Control then returns to block 208 of FIG. 2A.

Multilayer Switching

Multilayer switching is made possible when one or more switches in the Layer 2 path are configured as switch engines. Each switch engine is configured to bypass one or more specific route processors and to multilayer switch certain types of flows. There may be more than one switch engine that is configured to bypass a given route processor. Network design and efficiency considerations dictate which route processor a switch engine may be configured to bypass and what flow criteria are to be satisfied before multilayer switching may take place. An example of a switch that may be configured as a switch engine is the Catalyst 5000/RSM, commercially available from Cisco Systems, Inc., San Jose, Calif.

Switch engines may perform multilayer switching based on the information contained in the switch engine cache. The switch engine cache includes a management information base ("MIB"), which is a database of network management information. An example of a MIB is the CISCO-SWITCH-ENGINE-MIB. The MIB stores information about which route processors the switch engine may bypass. The MIB also stores flow criteria and MLS-entries. Referring again to FIG. 1, in order to illustrate a simple case of multilayer switching, an MLS-entry is created in the MIB of Switch S 104 when the first packet of a large file transfer traverses the single-packet path between Host A 102 and Host B 108.

Flow Criteria

Whether a flow traverses the single-packet path or the mutilayer-switching path with respect to a given route processor depends in part on whether certain parameters of each packet match certain flow criteria. The relevant parameters of the packet are SOURCE, DESTINATION, PORT. Switch engine MIBs contain flow criteria, designated by flowmasks. A flowmask may have the value: DESTINATION ONLY, SOURCE—DESTINATION ONLY, SOURCE/SOURCE PORT ID—DESTINATION/DESTINATION PORT ID.

MLS-Entries

MLS-entries contain flow information for a particular flow. The flow information includes values identifying source and destination MAC address, source and destination network address, encapsulation type and destination VLAN. A packet may be multilayer switched by the switch engine only if there is an MLS-entry in the switch engine's MIB that matches the flow information of a packet or sequence of packets. A switch engine may contain several MLS-entries associated with different flows and which may be associated with different route processors.

In one embodiment, when the first packet of a sequence of packets traverses a switch engine and the parameters of the packet satisfy one of the flowmasks in the MIB of the switch engine that the packet is traversing, then an MLS-entry is created in the MIB for the particular flow. Once the MLS-entry is created, subsequent packets of the particular sequence of packets will be multilayer switched by the switch engine.

Referring again to the example of FIG. 1, assume that the flow criteria in the example as specified by a flowmask in the MIB of Switch S 104 is FLOWMASK=DESTINATION ONLY. When the first packet traverses the single-packet path Host A 102->Switch S 104->Router R 106->Switch S 104->Host B 108, an MLS-entry is created in Switch S 104 for the flow, because the destination parameter of the packet satisfies the flowmask. Once the MLS-entry is created for the flow, subsequent packets from the file transfer may traverse the multilayer switched path Host A 102->Switch S 104->Host B 108.

In one embodiment, an MLS-entry will not be created in the switch engine even though the packet or sequence of packets satisfies a flowmask in the MIB, because the packet or sequence of packets has encryption or compression requirements.

In one embodiment, the MLS-entries in a MIB are purged or "aged-out" after a predetermined period of inactivity. For example, if no packets associated with the particular MLS-entry traverses the switch engine after the predetermined period of inactivity, then the MLS-entry is aged-out.

Relationship Between Route Engine and Switch Engine

As defined above, a route engine is a route processor that is deliberately bypassed as part of multilayer switching. Each route engine has one or more associated switch engines that form a multilayer switching context. In one embodiment, the relationship between a route engine and its associated switch engine is discoverable by a network management discovery program. An example of such a network management discovery program is the Asynchronous Network Interface (ANI), which forms part of network management software products that are commercially available from Cisco Systems, Inc., San Jose, Calif. ANI also may be used to carry out discovery of devices and the physical topology of a network, resulting in creating and storing basic network management information such as device identity, module and port information, and physical topology.

When used for multilayer switching, a route engine re-writes the header of the first packet from a sequence of packets that satisfy the given flow criteria. For example, the route engine re-writes the MAC addresses and decrements the Time-to-live ("TTL") parameter of the packet. When subsequent packets of the flow are multilayer switched by an associated switch engine, the switch engine takes on the task that the route engine would have performed on the packets by re-writing the MAC addresses, etc.

If the route engine has inbound access-list restrictions, then its associated switch engines will not create MLS-entries for packets that originate from a source identified in the inbound access-list.

In one embodiment, a switch engine may have a single flowmask that is set to the most restrictive flowmask requested by any of the switch engines associated route engines. For example, assume that switch engine SE1 is associated with route engines RE1 and RE2. Assume that route engine RE1 requests flowmask=DESTINATION only and route engine RE2 requests flowmask=SOURCE-DESTINATION. The flowmask of switch engine SE1 is set to SOURCE-DESTINATION.

Establishing a Multilayer Switched Flow

In one embodiment, packets from an actual flow are actively flowing between the given source device and destination device at the time the multilayer switching path is determined. If there is no active flow, it is likely that the MLS-entries in the switch engines would have aged-out.

Figure 2D:
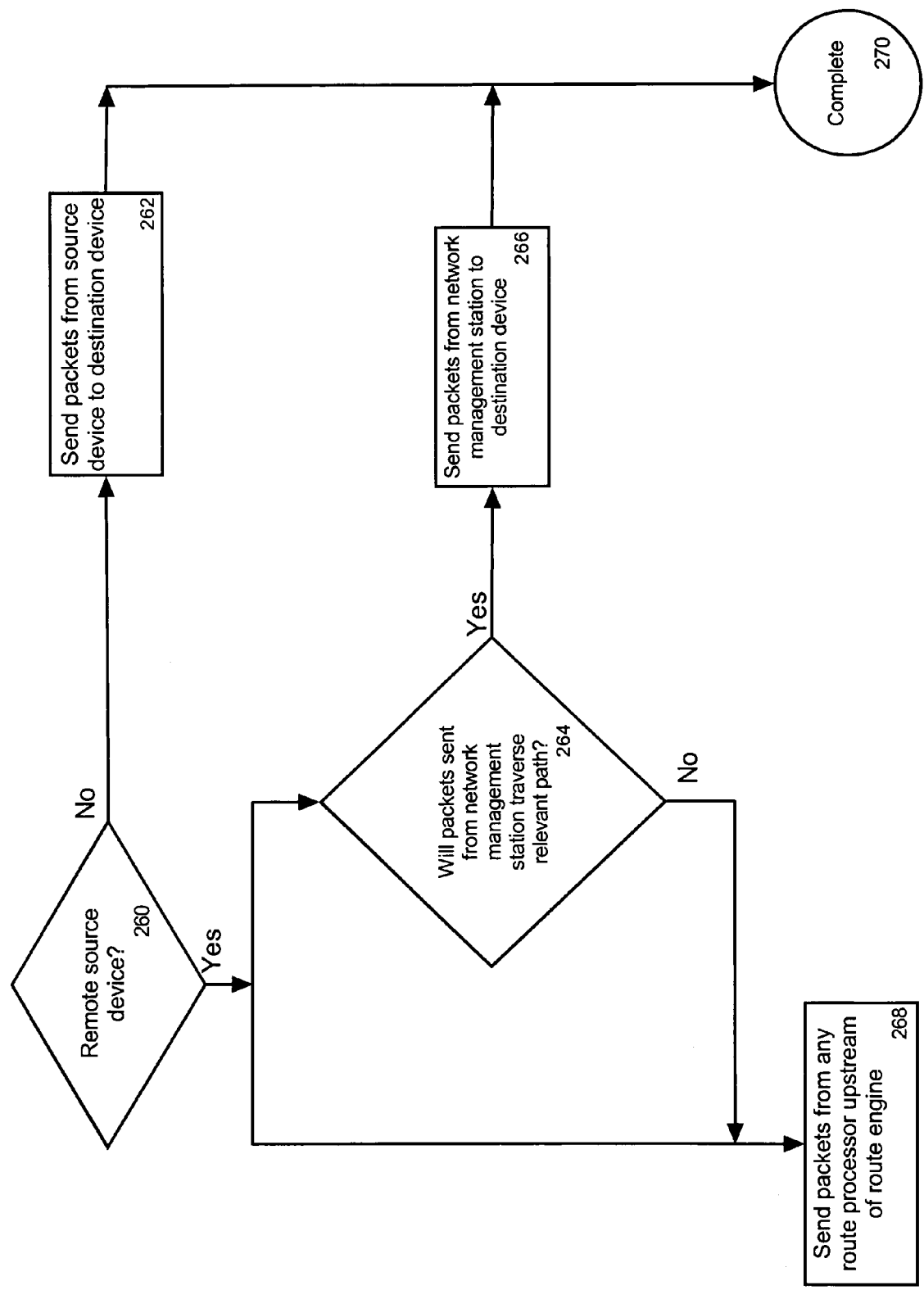
FIG. 2D is a flowchart that illustrates a method for establishing a flow between a source device and a destination device if no flow exists at the time the multilayer switching path is determined.

FIG. 2D is a flowchart that illustrates a method for establishing a flow between the given source device and destination device pair if no flow exists at the time the multilayer switching path is determined.

At block 260, the process determines whether the source device is remote. If the process determines that the source device is not remote, then the process causes the source device to send packets to the destination device, as indicated by block 262. Processing concludes at block 270. If the process determines that the source device is remote, then the process may choose one of two alternatives. According to one alternative, at block 268, the process causes packets to be sent to the destination device from any route processor that is upstream in the Layer 2 path from the given route engine for which a multilayer switching path is being determined. According to the other alternative, at block 264 the process determines whether packets that are sent from a network management station to the destination device will traverse a relevant path. The relevant path is the path that traverses the particular switch engine that would have multilayer switched the router associated with the particular switch engine if there was an actual flow emanating from the source device and destined for the destination device. If the process determines that packets that are sent from a network management station to the destination device will traverse the relevant path, then at block 266 the process causes the network management station to send packets to the destination device. Otherwise, control passes to block 268.

As an example, CISCO-PING-MIB, commercially available from Cisco Systems, Inc., San Jose, Calif., may be used to inject packets from one device to another for a specified duration of time.

Tracing the Multilayer Switching Path

Referring to FIG. 2A, block 208, only those route processors in the Layer 3 path that have known Layer 2 paths leading to and emanating from them are considered for multilayer switching path determination. The route processors that have no known Layer 2 paths leading are ignored.

Figure 3:
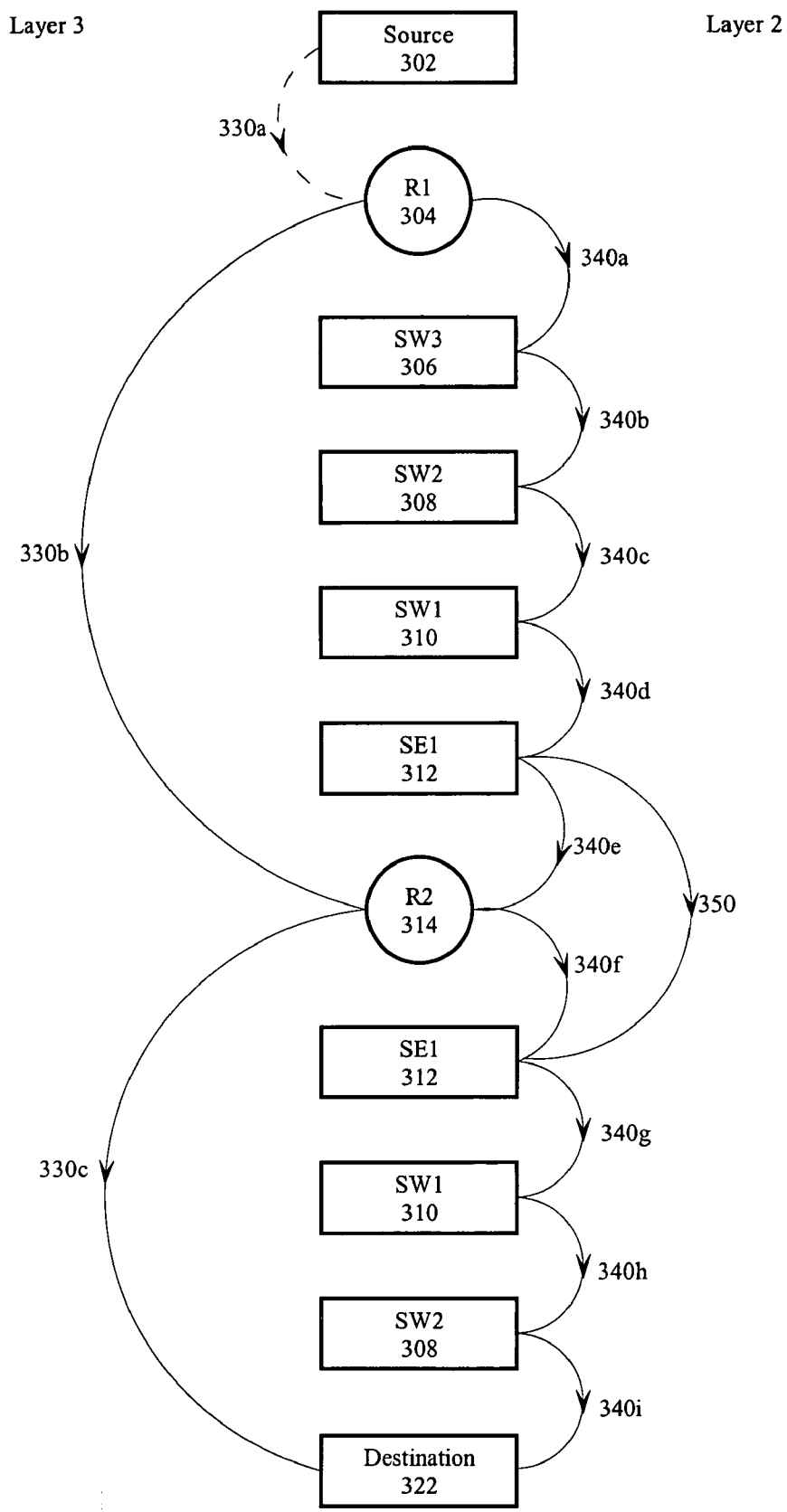
FIG. 3 is a block diagram that illustrates devices in the Layer 2 and Layer 3 paths for source and destination devices.

FIG. 3 is a block diagram that illustrates example devices in Layer 2 and Layer 3 paths for source and destination devices. Information defining the paths illustrated in FIG. 3 are examples of path information that is created and stored as part of block 208.

The Layer 3 path between Source 302 and Destination 322 comprises connections 330a to 330c. Connection 330a indicates the first hop connecting Source 302 and route processor R1 304. Connection 330b indicates the second hop from route processor R1 304 to route processor R2 314. Connection 330c indicates the third hop from route processor R2 314 to Destination 322.

The Layer 2 path comprises connections 340a to 340i. Connection 350 indicates the bypassing of route processor R2 314. The Layer 2 path between Source 302 and route processor R1 304 is unknown. Connections 340a to 340e comprise the Layer 2 path between R1 304 and R2 314. The Layer 2 devices between R1 304 and R2 314 are switches SW3 306, SW2 308, SW1 310, and switch engine SE1 312. Connections 340f to 340i comprise the Layer 2 path between R2 314 and Destination 322. The Layer 2 devices between R2 314 and Destination 322 are switch engine SE1 312, and switches SW1 310, SW2 308.

Route processor R2 314 is the only route processor in FIG. 3 that has a known Layer 2 path leading to and emanating from the route processor. Thus, only route processor R2 314 is considered in the multilayer switching path determination: There are several switches in the Layer 2 path leading and emanating from route processor R2 314. However, a path tracing process may assume that SE 1 312 is the only switch that is configured as a switch engine. Further, the path tracing process may assume that SE1 312 is configured for association with route processor R2 314.

Identifying Associated Switch Engines

Multilayer switching may be further complicated when there are multiple switch engines associated with a given route processor. When there are multiple switch engines associated with a route processor, then the switch engine that actually performs the multilayer switching for a particular flow is the relevant switch engine. The relevant switch engine is identified in order to determine the multilayer switching path for the particular flow.

As a first step to identifying the relevant switch engine for a given router, all the switches in the Layer 2 path leading to and emanating from the route processor, and which are configured as switch engines and configured for association with the particular route processor, are identified. There may be several switches in the Layer 2 path that either are not configured as switch engines or if configured as switch engines are not associated with the given route processor.

Figure 4A:
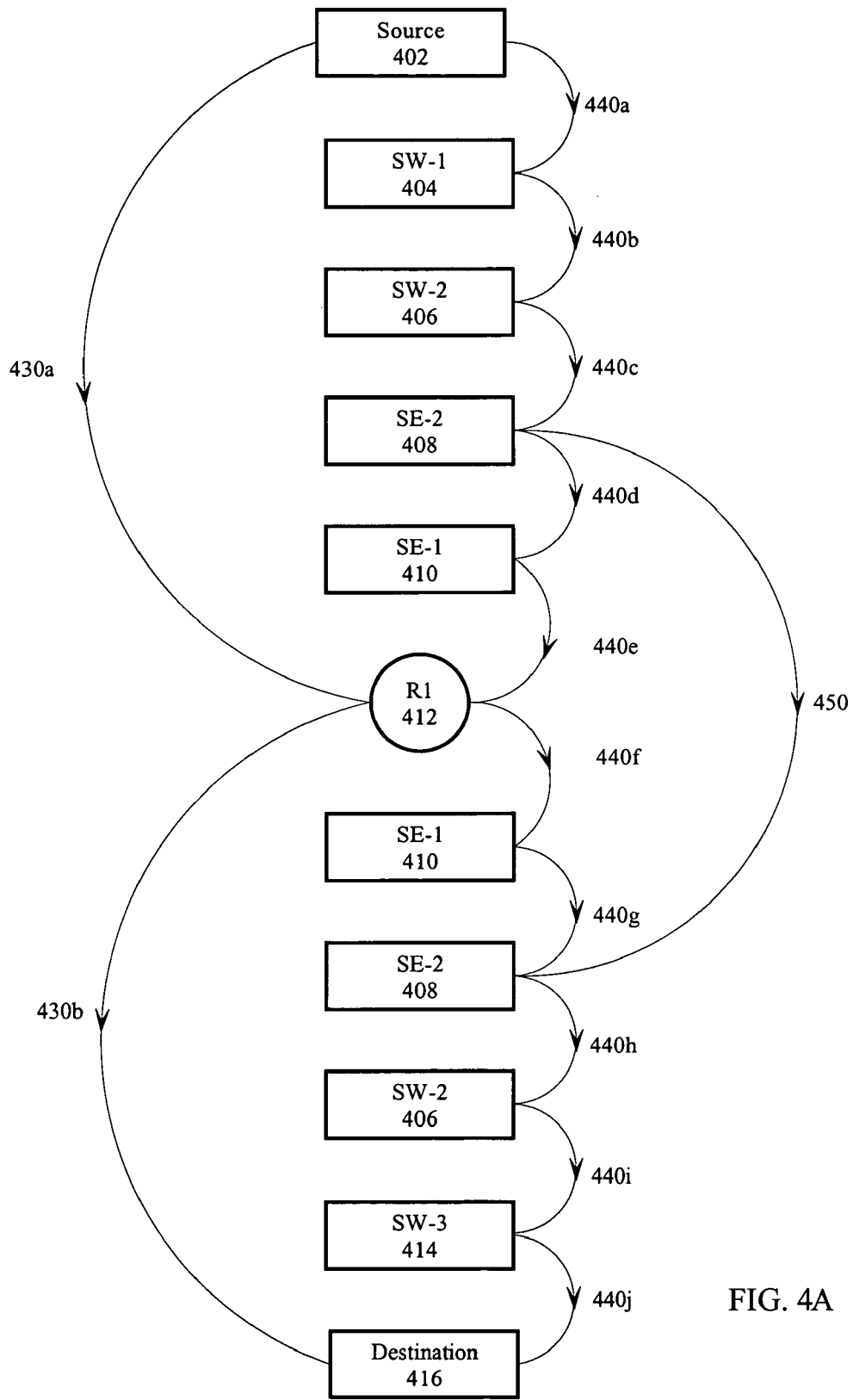
FIG. 4A is a block diagram that illustrates a route processor that is connected to several switches but is associated only with a subset of switches that are configured as switch engines.

FIG. 4A is a block diagram that illustrates a route processor that is connected to several switches but is associated only with a subset of switches that are configured as switch engines. The Layer 3 path between Source 402 and Destination 416 comprises connections 430*a*, 430*b*. Connection 430*a* indicates the first hop connecting Source 402 and route processor R1 412. Connection 430*b* indicates the second hop from route processor R1 412 to Destination 416. The Layer 2 path comprises connections 440*a* to 440*j*. Connection 450 indicates the bypassing of route processor R1 412. The Layer 2 devices on the Layer 2 path leading to R1 412 are switches SW-1 404, SW-2 406, SE-2 408, SE-1 410. The Layer 2 devices on the Layer 2 path emanating from R1 412 are switches SE-1 410, SE-2 408, SW-2 406, SW-3 414. Only SE-2 408, SE-1 410 are configured as switch engines and are also configured for association with route processor R1 412. Thus, route processor R1 412 is associated with more than one switch engine. However, only one of the switch engines is the relevant switch engine. A process of identifying a relevant switch engine is described herein in the section entitled IDENTIFYING THE RELEVANT SWITCH ENGINE.

When a route processor is associated with more than one switch engine, an MLS-entry is created in each associated switch engine's MIB. The MLS-entries in a MIB is purged or "aged-out" after a predetermined period of inactivity. Referring to FIG. 4A, an MLS-entry is created in SE-2 408, and SE-1 410 for a flow between Source 402 and Destination 416. However, only one of the switch engines is the relevant switch engine. The MLS-entry in the non-relevant switch engine is eventually deleted ("aged-out"), because the relevant switch will cause subsequent packets of the flow to bypass not only the associated route processor but also the non-relevant switch engine. The MLS-entry in the relevant switch engine also ages out when no more packets associated with the particular MLS-entry traverse the switch engine after the predetermined period of inactivity.

Identifying the Relevant Switch Engine

A process of identifying the relevant switch engine that is associated with a given route processor, and which actually performs the multilayer switching for a particular flow associated with a given source-destination pair of devices, is now described with reference to FIG. 2A and FIG. 4A.

Assume that a flow currently exists for the given source-destination pair of devices. According to block 210 of FIG. 2A, the process selects the switch engine that is (1) farthest upstream on the Layer 2 path leading to a given route processor, and (2) also on the Layer 2 path emanating from the given route processor, and (3) associated with a given route processor.

Referring to FIG. 4A, the process selects switch engine SE-2 408 because SE-2 408 is the switch engine that is (1) farthest upstream on the Layer 2 path leading to route processor R1 412, and (2) also on the Layer 2 path emanating from route processor R1 412, and (3) associated with route processor R1 412.

At block 212 of FIG. 2A, the process submits a query to the selected switch engine MIB for MLS-entries. Referring to FIG. 4A, the process submits a query for MLS-entries to the MIB of SE-2 408. If there exists in the MIB of SE-2 408 an MLS-entry that matches the parameters of the packets from the flow that currently exists between Source 402 and Destination 416, then SE-2 408 is the relevant switch engine.

Otherwise, referring to block 218 of FIG. 2A, the process selects the next switch engine downstream that satisfies the conditions described at block 210 of FIG. 2A. In FIG. 4A, assume that the MIB of SE-2 408 contains an MLS-entry that matches the parameters of the packets from the flow that currently exists between Source 402 and Destination 416. Thus, SE-2 408 is the relevant switch engine. If the MIB of SE-2 408 did not contain a matching MLS-entry, the process would have then selected SE-1 410 because SE-1 410 is the next switch engine downstream that satisfies the conditions described at block 210 of FIG. 2A. Also, because SE-2 408 is the relevant switch engine, the MLS-entry in the MIB of SE-1 410 will age out earlier than the MLS-entry in the MIB of SW-1 406.

Figure 4B:
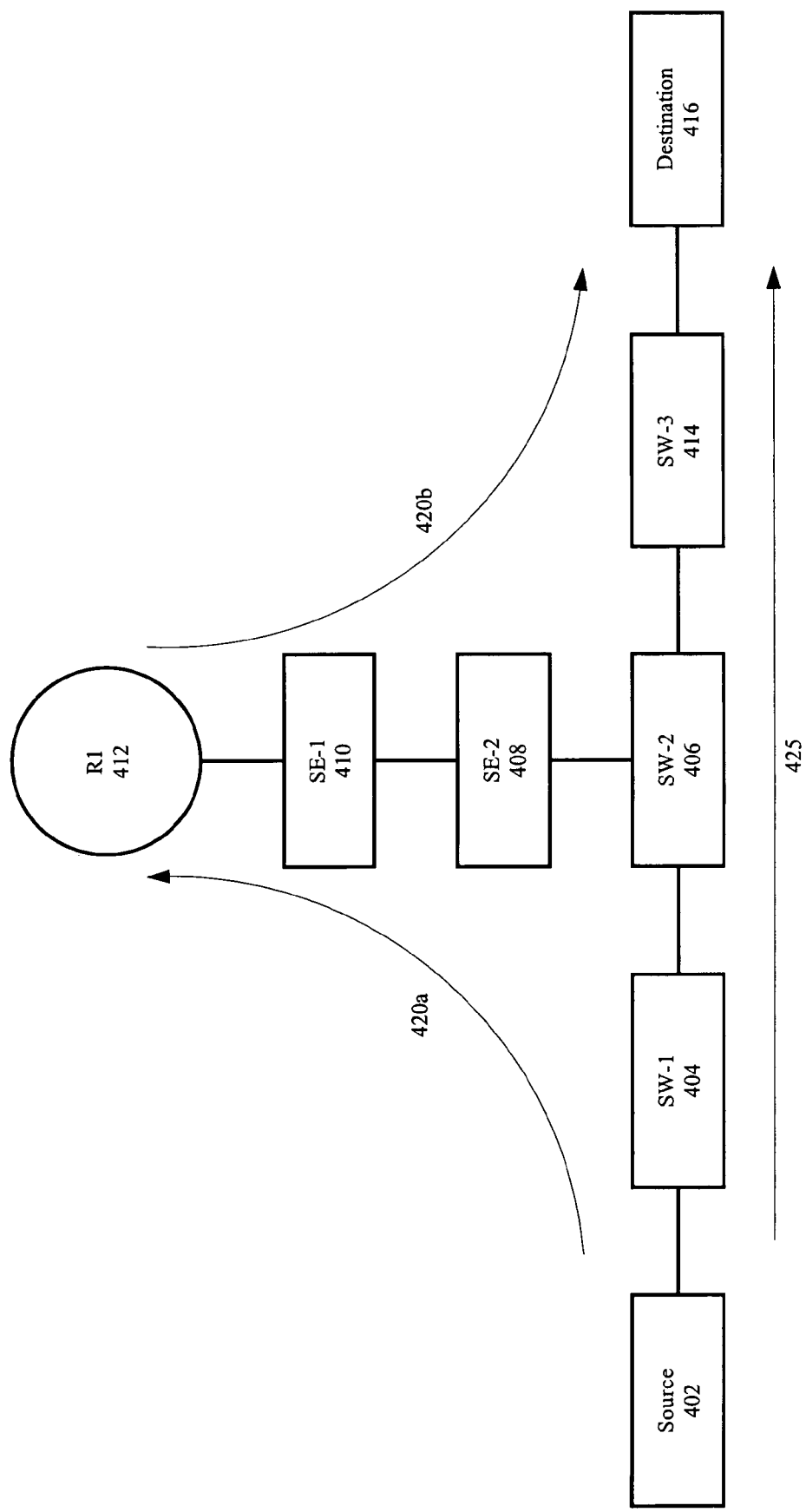
FIG. 4B is an alternate representation of FIG. 4A.

In FIG. 4A, the multilayer switching path comprises the connections 440*a*, 440*b*, 440*c*, 450, 440*h*, 440*i*, 440*j*. The network as shown in FIG. 4A may be alternately illustrated by FIG. 4B. The topology as represented by FIG. 4A and FIG. 4B is often referred to as a "router-on-a-stick". A router-on-a-stick topology is a simple network design that is useful for visualizing and implementing multilayer switching. The router-on-a-stick design and the multilayer switching path between Source 402 and Destination 416 are more visually evident in FIG. 4B. In FIG. 4B, the path comprising arrows 420*a*, 420*b* is the single-packet path. The path comprising the arrow 425 is the multilayer switching path.

Effect of Spanning Tree

The Spanning Tree Protocol, as specified in IEEE Specification 802.1D, is implemented in most network switches and provides a way of determining switching paths that are free of endless loops. Spanning Tree information for a given network may affect a multilayer switching path that is associated with a source-destination pair of devices. For example, FIG. 5A, FIG. 5B and FIG. 5C are block diagrams that illustrate the effect of spanning tree information associated with a particular VLAN.

Figure 5A:
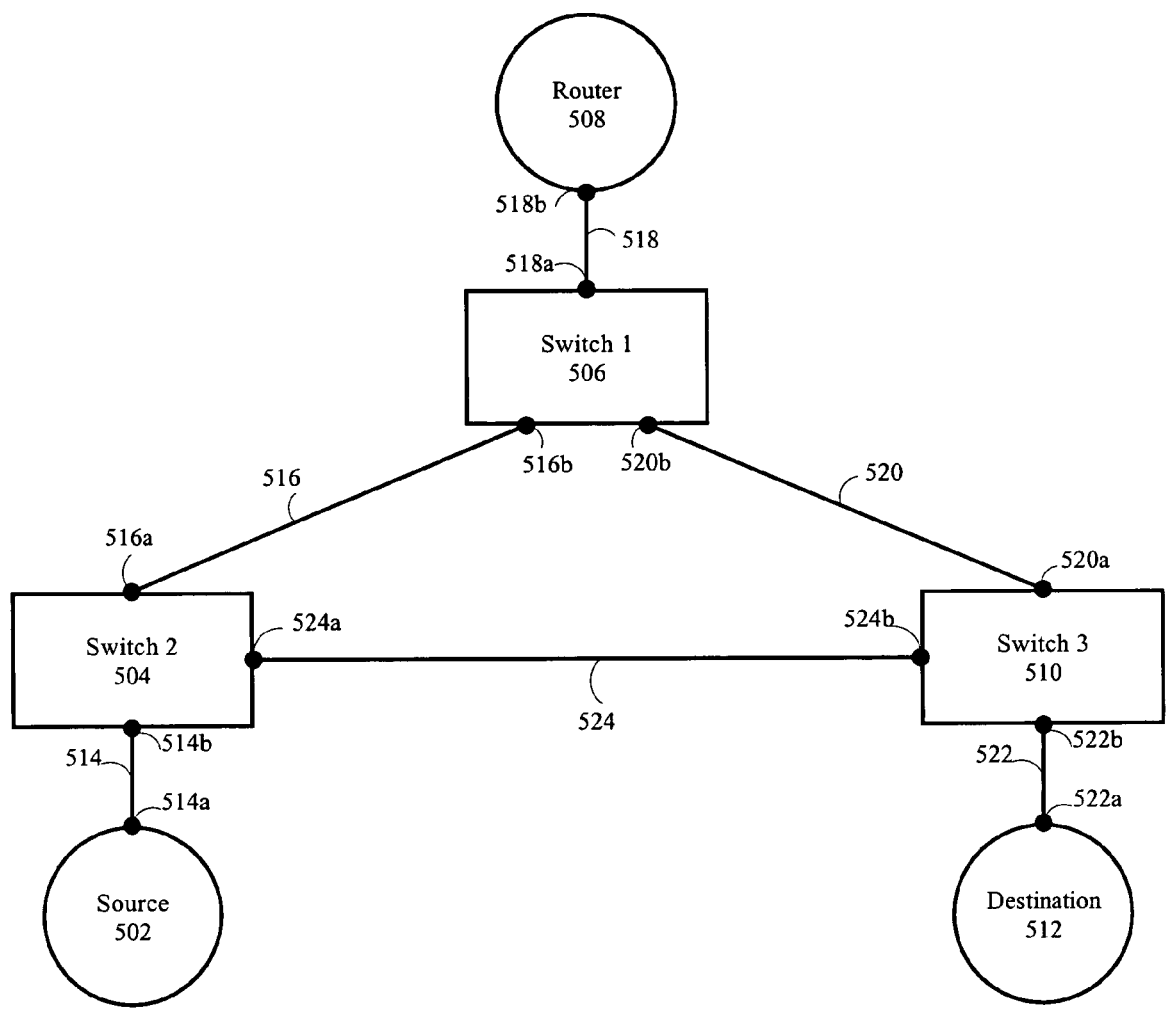
FIG. 5A is block diagram that illustrates the effect of spanning tree information associated with a particular VLAN.
Figure 5B:
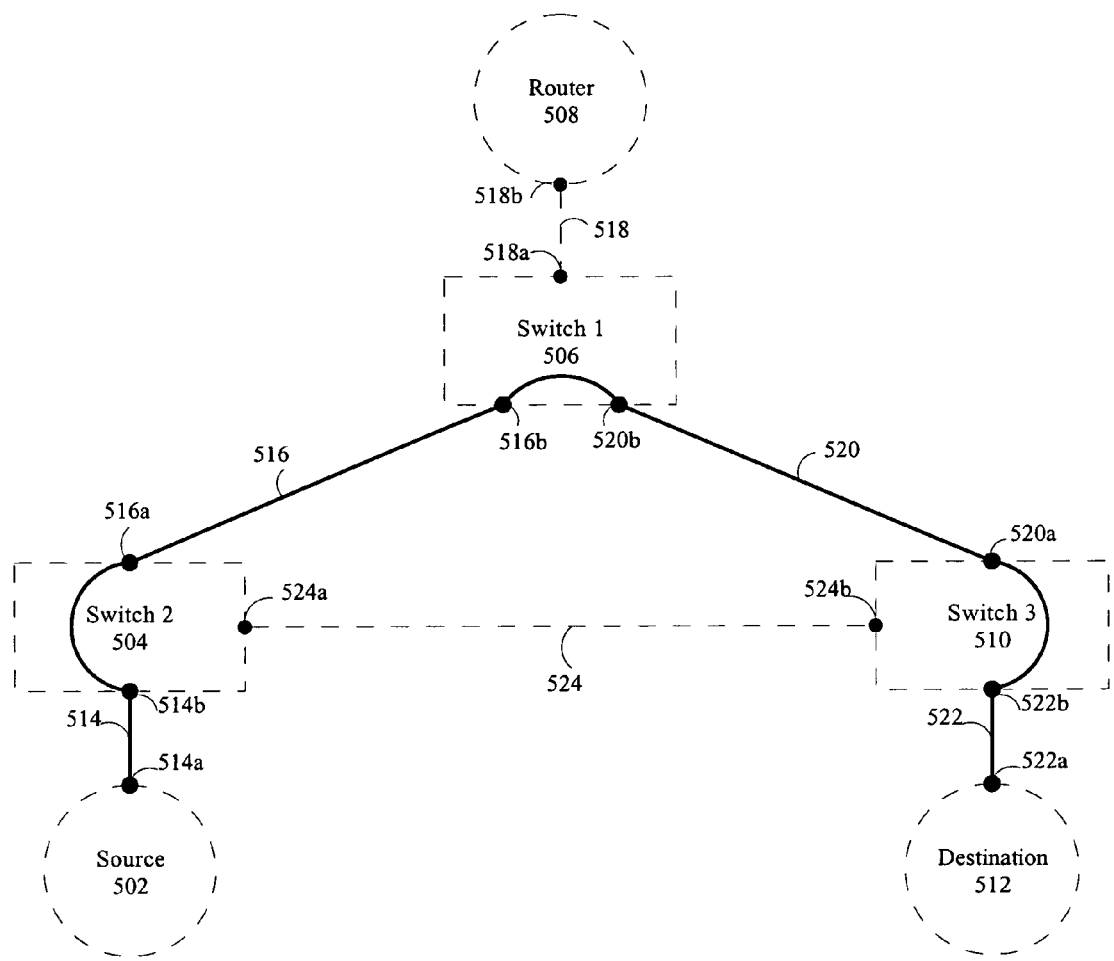
FIG. 5B is an alternate representation of FIG. 5A.
Figure 5C:
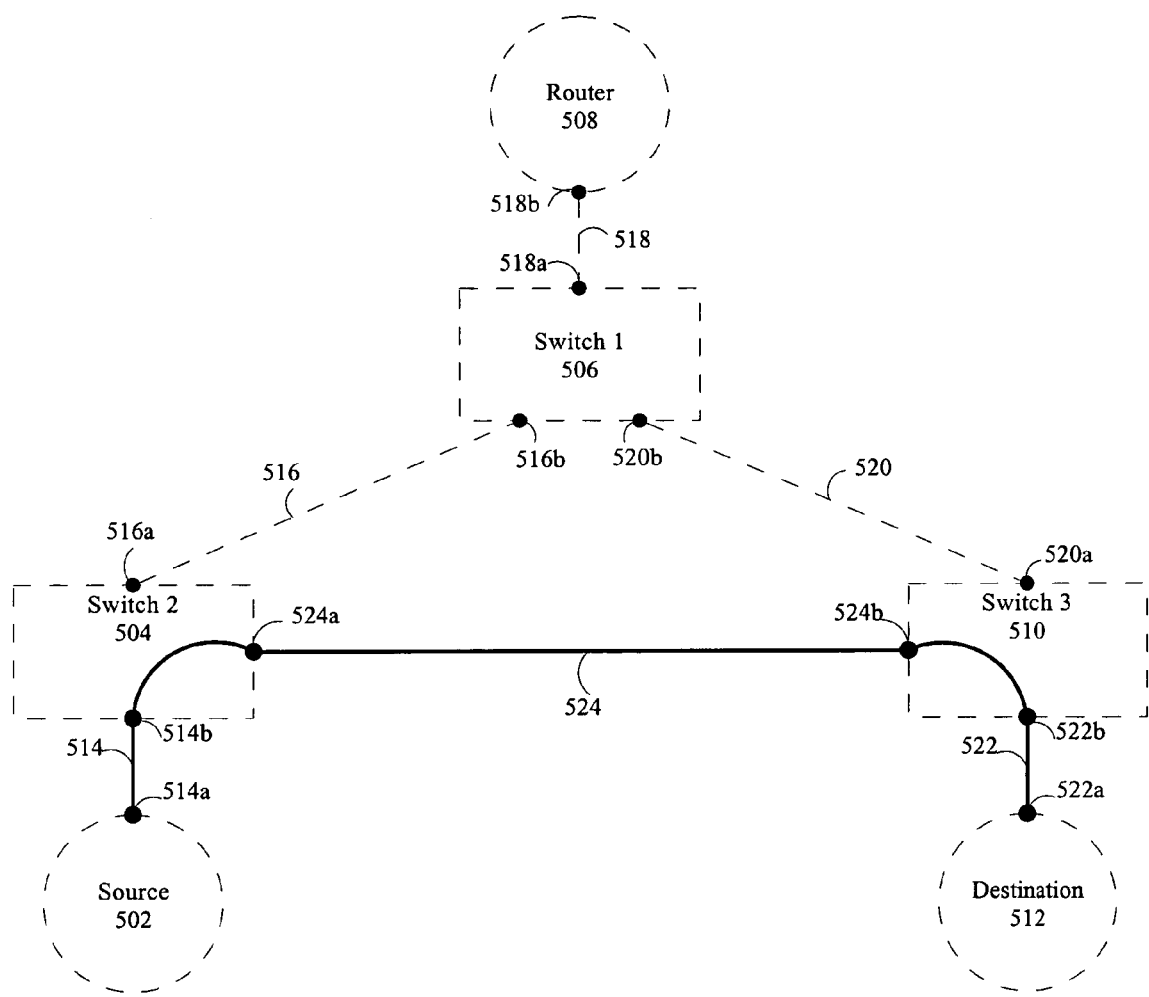
FIG. 5C is an alternate representation of FIG. 5A.

In FIG. 5A, source 502 is connected to Switch 2 504 by connection 514 through access ports 514*a*, 514*b*. Switch 2 504 is connected to Switch 1 506 by connection 516 through access ports 516*a*, 516*b*. Switch 2 504 is also connected to Switch 3 510 by connection 524 through access ports 524*a*, 524*b*. Switch 1 506 is connected to Router 508 by connection 518 through access ports 518*a*, 518*b*. Switch 1 506 is also connected to Switch 3 510 by connection 520 through access ports 520*a*, 520*b*. Switch 3 510 is connected to Destination 512 by connection 522 through access ports 522*a*, 522*b*. Assume that Switch 1 506 and Switch 3 510 are configured as switch engines and are configured for association with Router 508.

If according to the spanning tree information access port 524*a* is blocked, then the Layer 2 path for the source-destination pair Source 502 and Destination 512 is as follows:

Source 502->Switch 2 504->Switch 1 506->Router 508->Switch 1 506->Switch 3 51 0->Destination 512.

Assume that Switch 1 506 and Switch 3 510 are configured as switch engines and are configured for association with Router 508. Thus, the multilayer switching path is as illustrated by the solid lines in FIG. 5B.

If according to the spanning tree information, access port 516*a* is blocked, then the Layer 2 path for the source-destination pair Source 502 and Destination 512 is as follows:

Source 502->Switch 2 504->Switch 3 510->Switch 1 506->Router 508->Switch 1 506->Switch 3 510->Destination 512.

Thus, the multilayer switching path is as illustrated by the solid lines in FIG. 5C.

Hardware Overview

Figure 6:
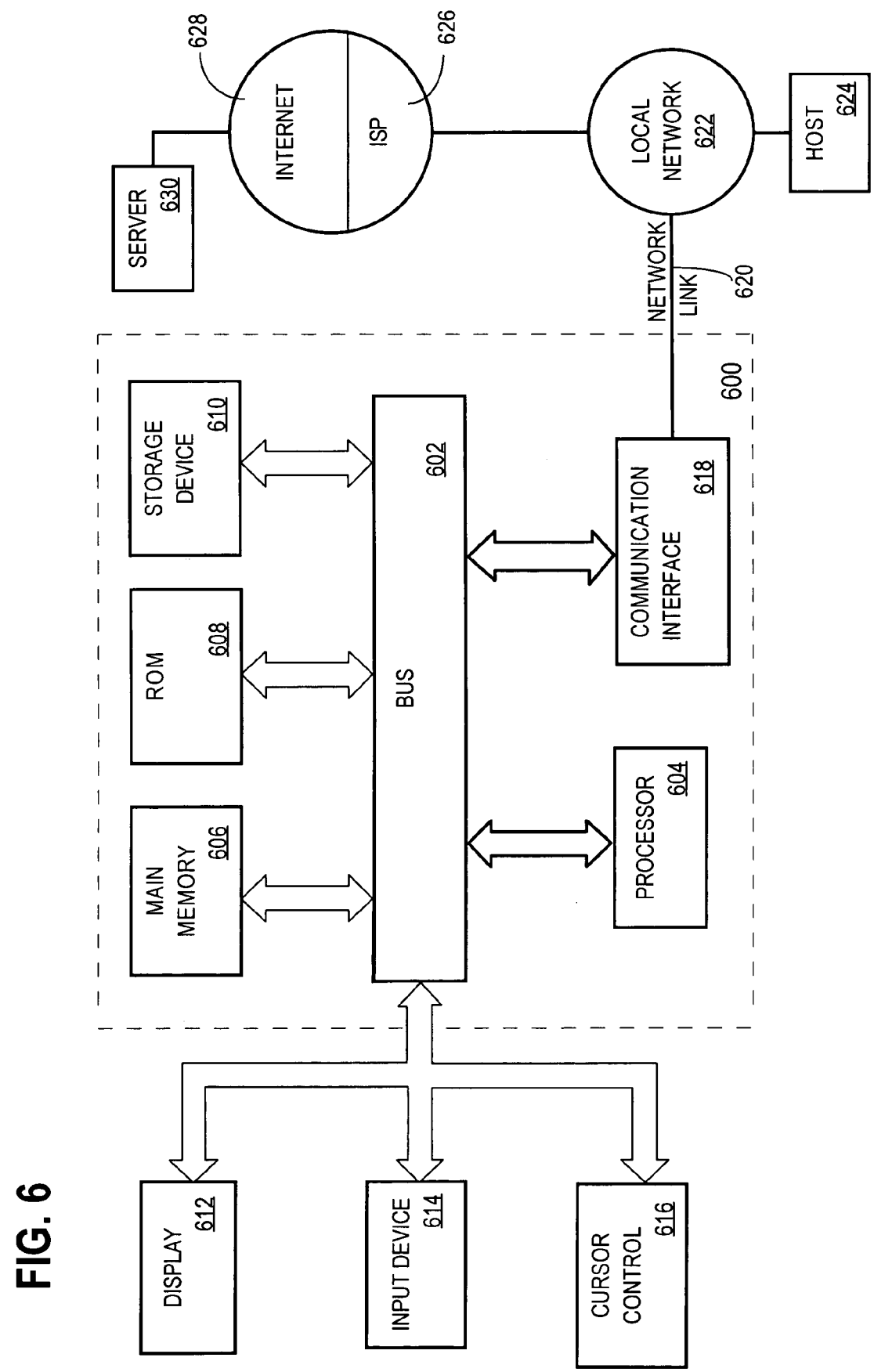
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for determining a multilayer switching path in a switched network. According to one embodiment of the invention, determining a multilayer switching path in a switched network is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for determining a multilayer switching path in a switched network as described herein.

The received code may be executed by processor 604 as it is received, and/or stored in storage device 610, or other non-volatile storage for later execution. In this manner, computer system 600 may obtain application code in the form of a carrier wave.

Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining a multilayer switching path in a network, the method comprising the steps of:

determining a Layer 3 path through the network from a first device to a second device;

determining a Layer 2 path through the network from the first device to the second device;

selecting a route processor that is included in both the Layer 3 path and in the Layer 2 path;

selecting a switch that multilayer switches the route processor;

based on the selected switch, generating information that defines the multilayer switching path from the first device to the second device.

2. A method as recited in claim 1, wherein:
the network is a switched network;
the first device is a source device;
the second device is a destination device; and
a management station performs the steps of determining the Layer 3 path, determining the Layer 2 path, selecting the route processor, selecting the switch, and generating the information.

3. A method as recited in claim 1, wherein the step of selecting the route processor further comprises selecting the route processor that is in the Layer 3 path and that appears on the same portion of the Layer 2 path that both leads to and emanates from the route processor.

4. A method as recited in claim 1, wherein the step of selecting the route processor further comprises selecting the route processor that is in the Layer 3 path and that is communicatively coupled to only one other device that appears on the Layer 2 path.

5. A method as recited in claim 1, wherein the step of selecting the switch further comprises selecting the switch that satisfies one or more criteria as a relevant switch engine.

6. A method as recited in claim 1, wherein the step of selecting the switch further comprises selecting the switch that satisfies one or more criteria as a relevant switch engine, based on spanning tree information.

7. A method as recited in claim 1, wherein the step of generating information that defines the multilayer switching path further comprises:
creating information that defines the multilayer switching path from the first device to the second device and that identifies the first device, the second device, and the switch; and
storing the information.

8. An apparatus for determining a multilayer switching path in a network, the apparatus comprising:
means for determining a Layer 3 path through the network from a first device to a second device;
means for determining a Layer 2 path through the network from the first device to the second device;
means for selecting a route processor that is included in both the Layer 3 path and in the Layer 2 path;
means for selecting a switch that multilayer switches the route processor;
means for generating, based on the switch selection, information that defines the multilayer switching path from the first device to the second device.

9. An apparatus as recited in claim 8, wherein:
the network is a switched network;
the first device is a source device;
the second device is a destination device; and
the apparatus is a management station.

10. An apparatus as recited in claim 8, wherein the means for selecting the route processor further comprises means for selecting the route processor that is in the Layer 3 path and that appears on the same portion of the Layer 2 path that both leads to and emanates from the route processor.

11. An apparatus as recited in claim 8, wherein the means for selecting the route processor further comprises means for selecting the route processor that is in the Layer 3 path and that is communicatively coupled to only one other device that appears on the Layer 2 path.

12. An apparatus as recited in claim 8, wherein the means for selecting the switch further comprises means for selecting the switch that satisfies one or more criteria as a relevant switch engine.

13. An apparatus as recited in claim 8, wherein the means for selecting the switch further comprises means for selecting the switch that satisfies one or more criteria as a relevant switch engine, based on spanning tree information.

14. An apparatus as recited in claim 8, wherein the means for generating information that defines the multilayer switching path further comprises:
means for creating information that defines the multilayer switching path from the first device to the second device and that identifies the first device, the second device, and the switch; and
means for storing the information.

15. An apparatus for determining a multilayer switching path in a network, the apparatus comprising:
a network interface that receives one or more messages from the network;
one or more processors couples to the network interface to receive the messages;
a memory accessible to the one or more processors; and
one or more sequences of instructions stored in the memory which, when executed by the one or more processors, cause the one or more processors to carry out the steps of:
determining a Layer 3 path through the network from a first device to a second device;
determining a Layer 2 path through the network from the first device to the second device;
selecting a route processor that is included in both the Layer 3 path and in the Layer 2 path;
selecting a switch that multilayer switches the route processor;
based on the selected switch, generating information that defines the multilayer switching path from the first device to the second device.

16. An apparatus as recited in claim 15, wherein:
the network is a switched network;
the first device is a source device;
the second device is a destination device; and
the apparatus is a management station.

17. An apparatus as recited in claim 15, wherein the instructions for selecting the route processor further comprises one or more sequences of instructions in the memory which, when executed by the one or more processors, cause the one or more processors to carry out selecting the route processor that is in the Layer 3 path and that appears on the same portion of the Layer 2 path that both leads to and emanates from the route processor.

18. An apparatus as recited in claim 15, wherein the instructions for selecting the route processor further comprises one or more sequences of instructions in the memory which, when executed by the one or more processors, cause the one or more processors to carry out selecting the route processor that is in the Layer 3 path and that is communicatively coupled to only one other device that appears on the Layer 2 path.

19. An apparatus as recited in claim 15, wherein the instructions for selecting the switch further comprises one or more sequences of instructions in the memory which, when executed by the one or more processors, cause the one or more processors to carry out selecting the switch that satisfies one or more criteria as a relevant switch engine.

20. An apparatus as recited in claim 15, wherein the instructions for selecting the switch further comprises one or more sequences of instructions in the memory which, when executed by the one or more processors, cause the one or more processors to carry out selecting the switch that satisfies one or more criteria as a relevant switch engine, based on spanning tree information.

21. An apparatus as recited in claim 15, wherein the instructions for generating information that defines the multilayer switching path further comprises one or more sequences of instructions in the memory which, when executed by the one or more processors, cause the one or more processors to carry out:
   creating information that defines the multilayer switching path from the first device to the second device and that identifies the first device, the second device, and the switch; and
   storing the information.

22. A system for determining a multilayer switching path in a network, the system comprising:
   a first device in the network;
   a second device in the network;
   one or more route processors;
   one or more switches; and
   a third device in the network, wherein the third device is configured to:
      determine a Layer 3 path through the network from the first device to the second device;
      determine a Layer 2 path through the network from the first device to the second device;
      select from the one or more route processors a particular route processor that is included in both the Layer 3 path and in the Layer 2 path;
      select from the one or more switches a particular switch that multilayer switches the particular route processor;
      generate, based on selecting the particular switch, information that defines the multilayer switching path from the first device to the second device.

23. A system as recited in claim 22, wherein:
   the network is a switched network;
   the first device is a source device;
   the second device is a destination device; and
   the third device is a management station.

24. A system as recited in claim 22, wherein the third device being configured to select the route processor further comprises the third device being configured to select the route processor that is in the Layer 3 path and that appears on the same portion of the Layer 2 path that both leads to and emanates from the route processor.

25. A system as recited in claim 22, wherein the third device being configured to select the route processor further comprises the third device being configured to select the route processor that is in the Layer 3 path and that is communicatively coupled to only one other device that appears on the Layer 2 path.

26. A system as recited in claim 22, wherein the third device being configured to select the switch further comprises the third device being configured to select the switch that satisfies one or more criteria as a relevant switch engine.

27. A system as recited in claim 22, wherein the third device being configured to select the switch further comprises the third device being configured to select the switch that satisfies one or more criteria as a relevant switch engine, based on spanning tree information.

28. A system as recited in claim 22, wherein the third device being configured to generate information that defines the multilayer switching path further comprises the third device being configured to:
   create information that defines the multilayer switching path from the first device to the second device and that identifies the first device, the second device, and the switch; and
   store the information.

* * * * *